United States Patent
Chen et al.

(10) Patent No.: US 9,690,474 B2
(45) Date of Patent: Jun. 27, 2017

(54) USER INTERFACE, DEVICE AND METHOD FOR PROVIDING AN IMPROVED TEXT INPUT

(75) Inventors: Xun Chen, Espoo (FI); Roope Rainisto, Helsinki (FI); Mohammad Anwari, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1753 days.

(21) Appl. No.: 11/963,287

(22) Filed: Dec. 21, 2007

(65) Prior Publication Data
US 2009/0160785 A1    Jun. 25, 2009

(51) Int. Cl.
*G06F 3/041* (2006.01)
*G06F 3/0488* (2013.01)

(52) U.S. Cl.
CPC ................................ *G06F 3/04883* (2013.01)

(58) Field of Classification Search
CPC ......... G06F 2203/04804; G06F 3/0481; G06F 3/017; G06F 3/0482; G06F 3/0483; G06F 3/0484; G06F 3/0485; G06F 3/0488; G06F 3/04883; G06F 17/241; G06F 17/242; G06F 17/243; G06F 3/03547; G06F 3/0411; G06F 2200/1634; G06F 2203/04807; G06F 2203/04808
USPC .................................... 345/173; 715/700–867
See application file for complete search history.

(56) References Cited

U.S. PATENT DOCUMENTS

| | | | |
|---|---|---|---|
| 5,283,560 A | 2/1994 | Bartlett | |
| 5,617,114 A * | 4/1997 | Bier | G06F 3/0481 345/634 |
| 6,118,427 A * | 9/2000 | Buxton | G06F 3/0481 345/629 |
| 6,587,118 B1 * | 7/2003 | Yoneda | G06F 3/0481 345/629 |
| 7,065,710 B2 * | 6/2006 | Hayashi | G06F 3/0362 715/720 |
| 7,561,145 B2 * | 7/2009 | Garside | G06F 3/03545 345/173 |
| 7,624,339 B1 * | 11/2009 | Engel | G06F 3/1423 715/212 |
| 7,831,922 B2 * | 11/2010 | Huapaya | G06F 3/0481 715/768 |
| 2002/0085037 A1 * | 7/2002 | Leavitt | G06F 3/04817 715/765 |
| 2003/0001899 A1 | 1/2003 | Partanen et al. | |
| 2004/0075652 A1 * | 4/2004 | Kang | G06F 3/04883 345/173 |

(Continued)

FOREIGN PATENT DOCUMENTS

WO    WO 2007/045938 A1    4/2007

*Primary Examiner* — Vinh Lam
(74) *Attorney, Agent, or Firm* — Alston & Bird LLP

(57) ABSTRACT

A user interface module for a device having a touch display arranged with virtual keys and at least one first area. The device is adapted to execute at least one application adapted to receive text input and the touch display is arranged to display content associated with the application. The touch display is also arranged to display a text input area upon activation of the application's receiving of text input. The text input area, at least partially, overlaps the at least one first area. The touch display is also arranged to display the content being displayed in the first area as shaded and arranged to display text input received through the text input area clearly.

17 Claims, 6 Drawing Sheets

(56) References Cited

U.S. PATENT DOCUMENTS

| | | | | |
|---|---|---|---|---|
| 2005/0025363 A1* | 2/2005 | Lui | ............... | G06F 3/038 |
| | | | | 382/187 |
| 2006/0242607 A1* | 10/2006 | Hudson | ............... | 715/863 |
| 2008/0122796 A1* | 5/2008 | Jobs | ............... | G06F 3/0488 |
| | | | | 345/173 |

* cited by examiner

USER INTERFACE, DEVICE AND METHOD FOR PROVIDING AN IMPROVED TEXT INPUT

FIELD

The present application relates to a user interface, a device and a method for touch input, and in particular to a user interface, a device and a method for text input using a touch display.

BACKGROUND

More and more electronic devices such as mobile phones, MP3 players, Personal Digital Assistants (PDAs) are becoming smaller and smaller while having more and more information stored and/or accessible through them. Users are relying on these devices and becoming all the more dependant on them. Due to the devices' complexity it can be difficult to maintain a complete overview of the device's status and operation while still allowing ample space for application data and input.

The environments in which these devices are used are also becoming more and more hectic with higher demands on fast access and multitasking, and not only in a professional environment but also in private and social environments. For example a user should be able to read a book, while holding a grocery bag in a rattling subway train and still be able to access the information stored in the device for the device to live up to the many requirements posed upon it by a user buying and using the device.

A device that always has all its information available would be useful in modern day society, but due to the size of the screen needed to display all the information at once such a device would be too big to be easy to carry around.

There are two major problems with the prior art and the first is that it can be confusing to a user and difficult for a designer to differentiate whether a touch input is meant as a text input or as a control input, especially when it comes to inputting diacritics and punctuations and to differentiate these from various taps. The other problem is that overlapping windows hide the text behind them so that a user looses the overview of the device's status and operation.

In the past some attempts have been made at overcoming this such as in the patent documents described below.

US 2003/0001899 disclose a user interface of a handwriting recognition system intended for use in small electronic devices, such as PDAs, mobile telephones and laptop computers. The user interface is a semi-transparent window that opens in response to a user-initiated manuscript input to any point on a touch-activated screen of a display of the electronic device. The semi-transparent window may be resized or moved, as desired by the user, and may be automatically sizable in response to the placement of the user's manuscript input on the touch-activated screen. The windows are shown as being small and thus not providing space enough to input complex characters or strings of characters. Also there is still confusion as to whether a stroke relates to a text input or a control input. Also the transparent window needs to be moved or relocated if a control being overlapped by the window is wanted by the user.

WO2007045938 disclose a method of entering text into an electronic device comprising a display, the method comprising: controlling the display to display one or more demarcated areas having a transparent background; detecting an input in one of the one or more demarcated areas; and in response to the detecting step controlling the display to display an opaque background instead of a transparent background for at least one of the one or more demarcated areas for text entry. Using this method the user is deprived of the overview as the demarcated area is displayed with an opaque background. Also the demarcated areas are displayed as being very small thus not being able to receive a string of characters.

U.S. Pat. No. 5,283,560 disclose a computer display control system displays semi-transparent control menus superimposed over other images. The computer system has a central processing unit, a program memory that stores an application or operating system program that generates and displays a first set of images on the display, and a menu generating program that displays a control menu having a list of menu items. The displayed control menu is a stippled image that is partially transparent. When the control menu is superimposed over the first set of images, the first set of images remains visible on the display below the control menu. The menu generating program logically ANDs predefined control menu images with a halftone screen so as to generate a stippled control menu image comprising an array of interleaved transparent and non-transparent pixels. In the preferred embodiment, the menu generating program displays a first version of the control menu when the control menu is unselected and a second version when said control menu is selected. The first version has a higher percentage of transparent pixels than the second version, making the control menu less intrusive during normal use when the menu is unselected, and also making the control menu easier to see distinctly when it is selected. The overlapping menus shown are too small to allow hand writing input and especially of complicated cases and by simply changing the density of the pixels used to differentiate the views leads to a cluttered and confusing view as complicated characters are input having many details and the teachings of this document is thus not suited for text input.

SUMMARY

On this background, it would be advantageous to provide a device and a method that overcomes or at least reduces the drawbacks indicated above.

The disclosed embodiments provide a user interface module for a device having a touch display arranged with virtual keys and at least one first area, said device being adapted to execute at least one application adapted to receive text input, wherein said touch display is arranged to display content associated with said application and to display a text input area upon activation of said application's receiving of text input which text input area at least partially overlaps said at least one first area and wherein said touch display is arranged to display said content being displayed in said at least one first area as shaded and arranged to display text input received through said text input area clearly.

This enables a larger area to be used for text input than would otherwise be available while providing a user with status information, application data and other control means enabling a user to maintain an overview of a device's status and operation.

Alternatively or additionally the text input area substantially overlaps said at least one first area.

By overlapping a larger area is provided and as the text below is not hidden, but merely shaded, dimmed or displayed in a non-intrusive way it is not disturbing the clearly displayed pen traces in the text input area.

Furthermore by showing the underlying content shadedly a user is quickly and intuitively informed that a text input area is opened even though no borders or other markers are visible. Such borders or markers can be used to indicate the text area input more easily. If no borders or edge markers are used the display area is kept cleaner and less confusing.

By having two modes available depending on whether the text input area is active or not makes it easy for both a designer and a user to differentiate between whether touch input should be used for control input or text input.

In one embodiment the user interface module is further arranged to detect a special touch input from said text input and thereafter receiving control input from said text input. And in one embodiment this special touch input is a long-press. This enables a quick and intuitive switching between control input and text input without the need to re-render the display image.

Alternatively or additionally the user interface module is further arranged to interpret touch input received through said text input area as text input and arranged to interpret touch input received outside said text input area as control input while the text input area is displayed.

By interpreting all touch input received through the text input area as text input and all other touch input as control input provides a clear distinction between the various inputs received through the touch display.

Alternatively or additionally the user interface module is further arranged to interpret all touch input received as text input while the text input area is displayed.

Regarding all touch input as text input makes it easy for a user to input large characters or strings of characters as the borders of the text input area are no longer limiting.

Alternatively or additionally the user interface module is further arranged with at least one physical key, and arranged to interpret input through said physical key as control input.

By combining physical or hard key input with touch input a clear distinction between text input and control input is achieved.

Alternatively or additionally the user interface module is further arranged to display said content clearly and said text input received through said text input area as shaded upon receipt of a switch command.

By switching the display mode of the content in the text input area and the other area a user is made aware that the text input area has been activated or de-activated and what kind of input the touch input will be interpreted as in an easy and intuitive way.

Alternatively or additionally the at least one first area comprises a control area and wherein said content is at least one virtual key associated with application control.

Alternatively or additionally the at least one first area comprises an application area and wherein said content comprises application data.

Alternatively or additionally the at least one first area comprises a status area and wherein said content comprises a status indicator.

Alternatively or additionally the at least one first area comprises any combination of a control area, a status area or an application area.

Alternatively or additionally the user interface is further arranged to move said text input area upon user input. Alternatively or additionally the user interface is further arranged to re-size said text input area upon user input. This will enable a user to easily see or access content, data or virtual items that are overlapped by the text input area.

Alternatively or additionally the access to control functions is restricted while the text input area is active and as the text input area is inactive any input will be interpreted as being control input.

The aspects of the disclosed embodiments are also directed to providing a user interface module for a device having touch display means arranged with virtual keys and at least one first area, said device having means for executing at least one application adapted to receive text input, wherein said touch display means are for displaying content associated with said application and for displaying a text input area upon activation of said application's receiving of text input which text input area at least partially overlaps said at least one first area and wherein said touch display means are for displaying said content being displayed in said at least one first area as shaded and arranged to display text input received through said text input area clearly.

Such a user interface has the same benefits and advantages as explained above and below.

The aspects of the disclosed embodiments are also directed to providing a device having a user interface module as in any preceding claim. Alternatively or additionally the device is a mobile communications terminal. Alternatively or additionally the mobile communications terminal is a mobile telephone. Alternatively or additionally the mobile communications terminal is a mobile internet browser.

Such a device would benefit from the same advantages and benefits as explained above and below.

The aspects of the disclosed embodiments are also directed to providing a method for text input in a device having a touch display arranged to show at least one first area comprising displaying application content in said first area clearly, receiving user input to initiate text input, activating and displaying a text input area at least partially overlapping said at least one first area, and displaying application content in said first area being overlapped as being shaded.

Alternatively or additionally the text input area has a size substantially equal to said touch display.

Alternatively or additionally the method further comprises interpreting all input via said touch display as text input when said text input area is displayed actively and interpret all input via said touch display as control input otherwise.

Alternatively or additionally the method further comprises receiving a switch command and then if said text input area is displayed actively inactivating it or if said text input area is inactive activate said text input area.

Alternatively or additionally the device further comprises at least one physical key, and wherein said receiving of a switch command is received through said at least one physical key.

Alternatively or additionally the method further comprises interpreting all input via said touch display through said text input area as text input when said text input area is displayed actively and interpret all input via said touch display outside said text input area as control input.

Alternatively or additionally the method further comprises displaying said received text input clearly in said text input area and as being shaded in said first area when said text input area is displayed actively.

Alternatively or additionally the method further comprises detecting a special touch input and thereafter receiving control input from said text input.

Alternatively or additionally the special touch input is a long-press.

The aspects of the disclosed embodiments are also directed to providing a computer readable medium including at least computer program code for controlling a device comprising a display a touch display, said computer readable medium comprising software code for implementing a method as in any of claims above.

The aspects of the disclosed embodiments are also directed to providing a device incorporating and implementing a computer readable medium according to above.

The aspects of the disclosed embodiments are also directed to providing a touch screen text input device with a first control area with virtual keys, a second application area including at least one text field, a third semitransparent HWR area substantially covering the second area and a circuit that processes any touch stroke on said second or third area as handwritten text and any touch on said first area is processed as control input.

The aspects of the disclosed embodiments are also directed to providing a method for controlling a touch screen text input device with a first control area with virtual keys, a second application area including at least one text field, a third semitransparent HWR area substantially covering the second area, wherein said method comprises processing any touch stroke on said second or third area as handwritten text and processing any touch on said first area as control input.

Alternatively or additionally the first area is substantially shaped as a rectangle and located adjacent to one of the screen sides.

Alternatively or additionally the size of the second and third area is equal and the second and third area size also equal to the remaining screen size not occupied by the first area.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which.

DETAILED DESCRIPTION OF EMBODIMENTS

In the following detailed description, the device, the method and the software product according to the teachings for this application in the form of a cellular/mobile phone will be described by the embodiments. It should be noted that although only a mobile phone is described the teachings of this application can also be used in any electronic device such as in portable electronic devices such as laptops, PDAS, mobile communication terminals, electronic books and notepads and other electronic devices offering access to information.

Figure 1:
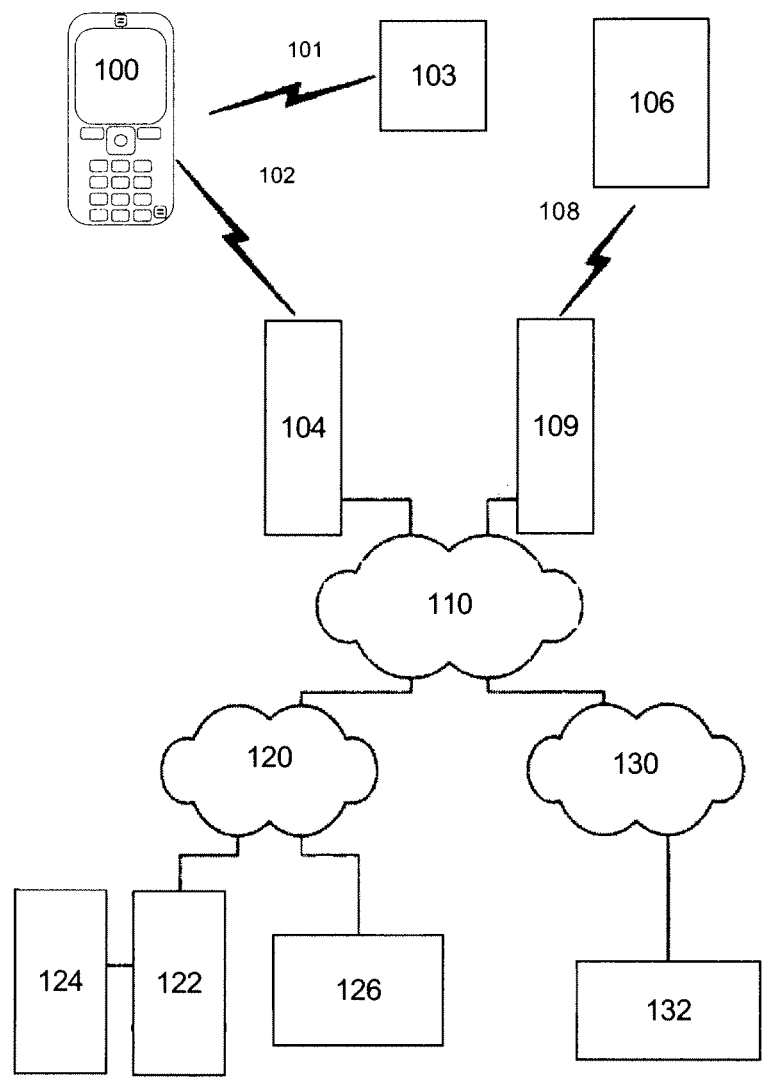
FIG. 1 is an overview of a telecommunications system in which a device according to the present application is used according to an embodiment.

FIG. 1 illustrates an example of a cellular telecommunications system in which the teachings of the present application may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 in a familiar manner. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, an RS-232 serial link, etc. The local devices 103 can for example be various sensors that can communicate measurement values to the mobile terminal 100 over the local link 101.

Figure 2:
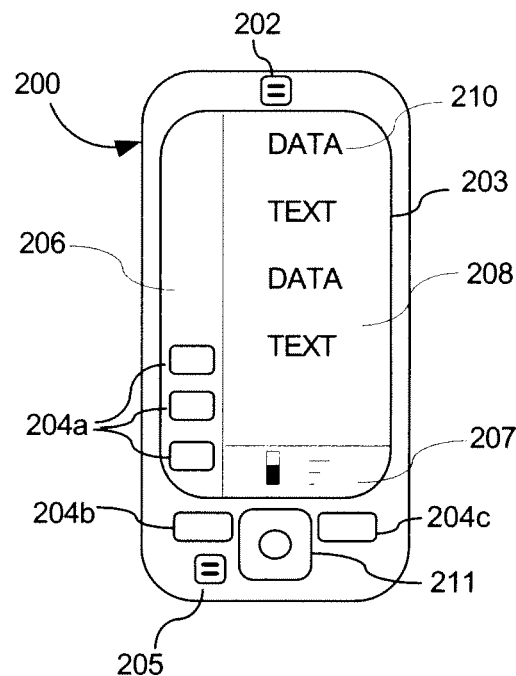
FIG. 2 is a plane front view of a device according to an embodiment.

An embodiment 200 of the mobile terminal 100 is illustrated in more detail in FIG. 2. The mobile terminal 200 comprises a speaker or earphone 202, a microphone 205, a main or first display 203 in the form of a touch display and a set of keys 204 which may include a virtual keypad 204a arranged on the touch display 203 and certain physical keys such as application or function specific keys or soft keys 204b, 204c and a joystick 211 or other type of navigational input device. There are three areas on the display 203, a main application area 208, a status area 207 and a control area 206. The application area is used to display information 210 for a currently active application. The status area 207 is used to display various status indicators such as for battery power, signal strength and download progress. The control area is used to house keys 204a that have a function associated with them. These functions can either be associated with the currently running application or with standard functions for the device. Both the control area and status area can be arranged anywhere on the display and the arrangement shown in FIG. 2 is only to be construed as an example of their placements.

Figure 3:
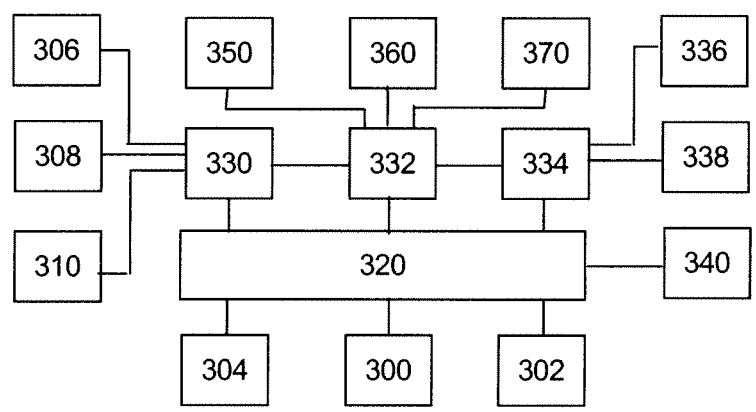
FIG. 3 is a block diagram illustrating the general architecture of a device of FIG. 1 in accordance with the present application, FIGS. 4a, b, c, d, e, f, g and h are plane front views of a device according to an embodiment, FIGS. 5a, b, c and d are front views of a display image according to an embodiment, and FIGS. 6a and b are flow charts describing a method each according to an embodiment.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as RAM memory, ROM memory, EEPROM memory, flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, an application handler 332 as well as various applications. The applications can include a calendar application 350, a notepad application 360, as well as various other applications 370, such as applications for voice calling, video calling, sending and receiving Short Message Service (SMS) messages, Multimedia Message Service (MMS) messages or email, web browsing, an instant messaging application, a phone book application, a calendar application, a control panel application, a camera application, one or more video games, a notepad application, etc. Another application is the hand writing recognition engine 340 that can either be an application or be implemented through a separate controller or as part of the controller 300.

The MMI 334 also includes one or more hardware controllers, which together with the MMI drivers cooperate with the touch display 336/203, the keypad 338/204 as well as various other I/O devices such as microphone, speaker, vibrator, ringtone generator, LED indicator, etc. As is commonly known, the user may operate the mobile terminal through the man-machine interface thus formed.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, AD/DA converters, etc.

The mobile terminal also has a SIM card 304 and an associated reader. As is commonly known, the SIM card 304 comprises a processor as well as local work and data memory.

FIG. 4 shows an embodiment of the present application implemented in a device as in FIG. 2, in this embodiment a mobile phone 400. As in FIG. 2 the device 400 has a touch display 403, virtual keys 404a and physical keys 404b and c, navigational means 411, a microphone 405 and a loudspeaker 402. The three areas 406, 407 and 408 are also shown in FIG. 4. For some applications, like text message composition, text input is highly necessary and the application also uses commands to send, store or add objects to the message being composed. One good way of handling text input on a user interface adapted for small and portable devices is hand writing recognition, HWR, where a user writes with his finger or a stylus on the touch display and the stylus movements are traced by the hardware and converted into characters by a Hand writing recognition engine, an HWR engine, 340 which can be made part of the controller 300, not shown in FIG. 4a. In this embodiment a fourth area 409 is activate and displayed or arranged on the touch display 403. This fourth area 409 is used only for text input and will be called a text input area 409. It should be noted that the other areas 406, 407 and 408 can still be used for touch input.

The text input area 409 accepts text input through hand writing recognition (HWR) and can therefore also be called a HWR area.

Figure 4A:
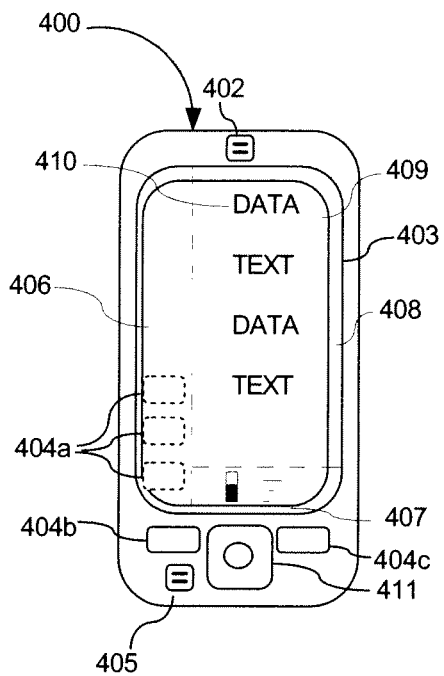

To allow a user to either input larger symbols, possibly having many details that need to be discerned between, or to input a series of symbols such as a complete word or a phrase at the same time the text input area 409 needs to be relatively large. In FIG. 4a the text input area 409 is large enough to allow this and due to its size it overlaps the other areas 406, 407 and 408. To enable a user to still see the content being displayed in the other areas 406, 407 and 408 the text input area 409 is semi- or fully transparent. In FIG. 4a the application data 410 shown in application area 408 is still visible.

The text input area 409 can further be marked by having a different color tone than the other areas 406, 407 and 408 or it can have a border such as in FIG. 4a. The border can either be a line, a dashed line, a fuzzy edge or a color shift.

Figure 4B:
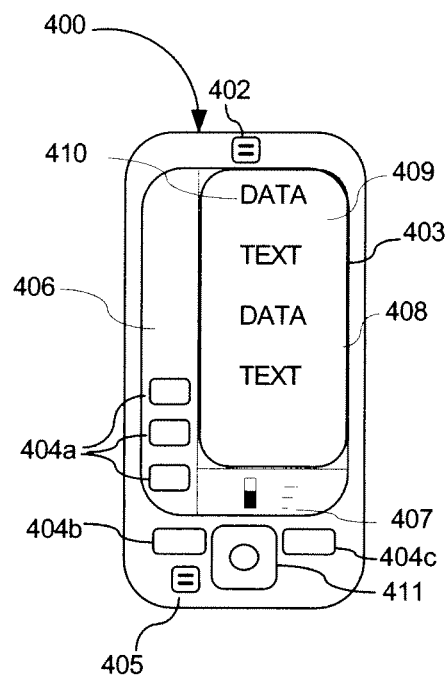
Figure 4C:
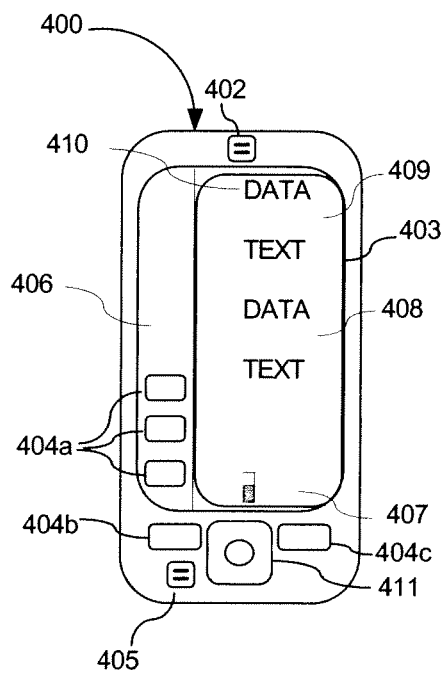
Figure 4D:
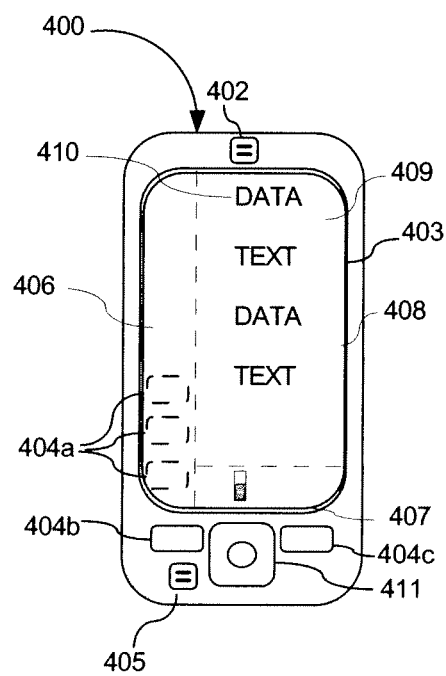

The size of the text input area 409 depends on the application and user needs. In FIG. 4a it is shown as being variable in size and also movable. Three possible standard sizes are shown in FIGS. 4b-4d. In FIG. 4b the text input area equals the application area 408 in size. In FIG. 4c the text input area equals the application area 408 and the status area 407 in size. In a device or user interface such as shown in FIG. 4c a circuit such as a controller 300 or a HWR engine 340 can be arranged to interpret or process any touch input received through the text input area, or HWR area, 409 as hand writing and any touch input received through the control area 406 as control input.

And In FIG. 4d the text input area equals the full display area. It should be noted that other sizes such as application area 408 plus control area 406 are also possible. Note how the underlying areas and their information become shaded as they are overlapped with the text input area 409 in the respective figures. This allows a user to still be able to see the underlying data or information being displayed and the user will thus maintain his overview of the status and operation of the device while utilizing a large area for touch input.

The shading of the underlying content is of importance as if it is done in the wrong way it renders the view cluttered and confusing. The central idea to the shading is that the underlying content should be displayed in a non-intrusive way and the overlapping content in a clear way. This can be done by varying the intensity and/or the color tone of the underlying content. One example is to show the overlapping text clearly in high intensity black with a larger and broader font and the underlying content in a softer grey tone with less intensity. Which shading to be used depends on the underlying and overlapping content and how similar they are. If they are of the same style a different color could be used to differentiate between the two using a distinct color like black and red for the overlapping content and a discrete color like light blue or grey for the underlying content. For images or other complex structures a dashed outline of the image or structure or a rendered line version of the image or structure content could be used to indicate the underlying content.

Alternatively the shading of the underlying content can be achieved by making the whole text input area 409 be shaded, for example by having a visual effect resembling frosted glass. Alternatively or additionally the overlapping text can be written with a transparent color. The transparency can be achieved by different visual tools such as interleaving pixels, contour lines etc. The overlapping text will thus be clearly displayed and the underlying will also be visible however in a non-intrusive way thus keeping the screen clear.

Figure 4E:
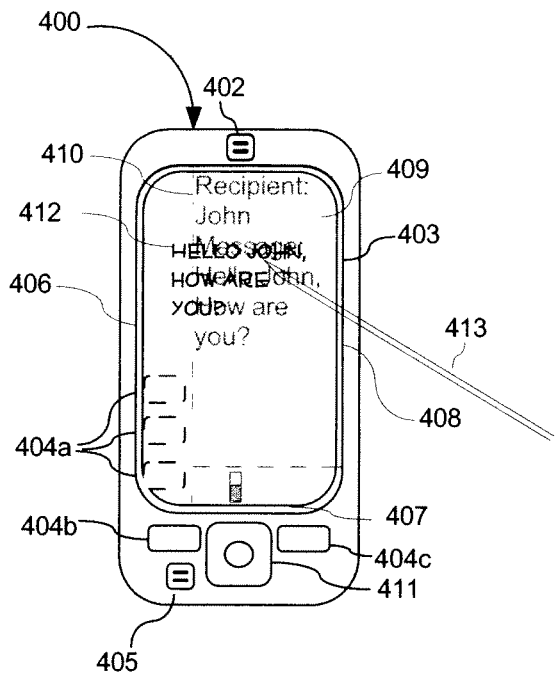
Figure 4F:
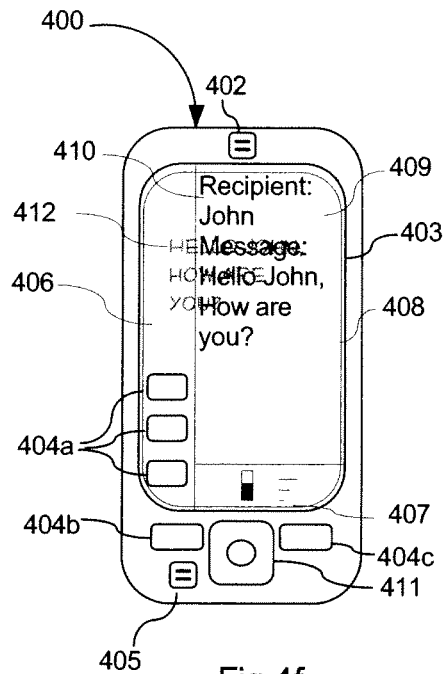
Figure 4G:
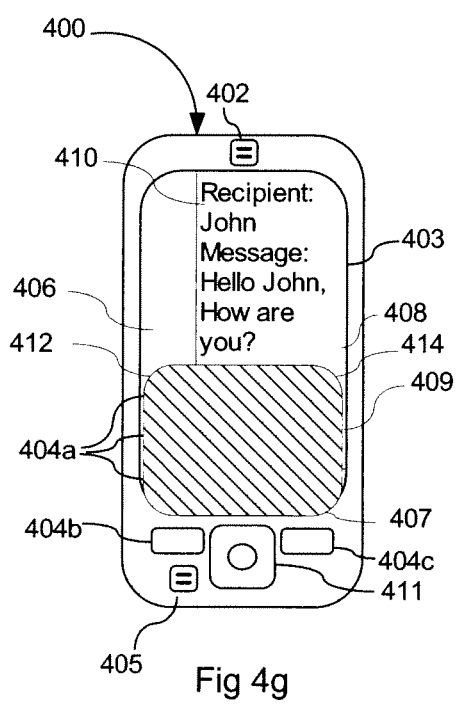
Figure 4H:
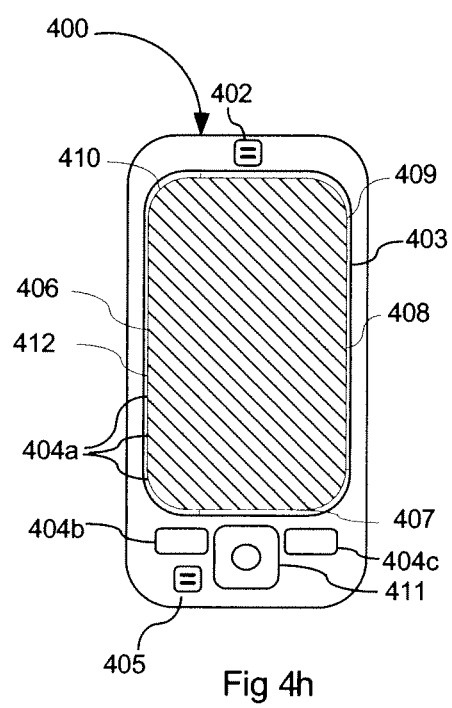

FIG. 4h shows one alternative wherein the text input area 409 has a frosted visual appearance which shades the underlying content 410 and the overlapping text 412 is displayed in bold giving a stark contrast. Using another color such as red further improves the visibility of both layers and makes it easy to differentiate between the two layers. It also enables a user to quickly ascertain which mode the device is currently operating in thereby enabling a user to enter data using the correct input method at once without first checking the status otherwise.

When a frosted or otherwise shaded text input area is deactivated it could be completely removed, only the borders displayed or it could be rolled out of the display giving the mental image of a writing glass being rolled up and/or down over the display. See example with reference to FIG. 4g.

The shading of the underlying content also indicates quickly and intuitively to a user which content is accessible through the text input area 409 thus enabling a user to quickly ascertain which actions are possible at any given moment and how actions will be interpreted by the controller 300. Anything shaded is not accessible and a switch command has to be issued to access them or the shaded content can possibly be accessed through the physical keys 404b and c or by other means.

It should be noted that any shading as described herein can be used in any embodiment described herein.

As a user writes something, possibly by using a stylus, that input is interpreted by the HWR engine 340 into characters. It is possible to input either a character at a time or a series of characters making up a word or a whole phrase. Inputting several characters at a time increases the likelihood of a positive match for the HWR input. In FIG. 4e a full screen text input area 409 is used to input text 412 using a stylus 413. The text 412 reads "Hello John, How are you?" and is clearly visible to a user and overlaps both the application area 408 and the control area 406. In the application area 408 the text is shown being shaded by the semi-transparent text input area so the user can still see what the status and operation of the device 400 is. Displayed along with the input text is information relating to the application. In this case the information indicates that it is a message with a specified recipient. As the user has written on the display 403 the text has overlapped the functional keys 404a. As the text is in the text input area 409 it is clear to the HWR engine 340 and the controller 300 that the pen strokes detected are in fact meant for text input and not for device control. The functional keys 404a can in this example be assigned the functions: SEND, DISCARD and SAVE and an accidental activation of one of the keys when the user was meaning to simply input a punctuation mark could have the consequence of deleting the message being typed. The controlled interpretation of the touch input as text input avoids this situation.

To enable control of the device 400 a switch key 404b is used to switch between the text input area 409 and the other areas 406, 407 and 408. As can be seen in FIG. 4f the text input area 409 is now shaded and the other symbols and text are displayed clearly. The switch key can either be a physical key 404c or a special icon displayed on the display 403 (not shown). As the view is switched either the text input area could be shaded or it can be removed from the display 403. Any touch input on a control element such as the virtual keys 404a will now be construed as a control input and not a text input. This allows a user to switch easily and intuitively between text input and control input.

In one embodiment control commands are given through the physical keys 404b, 404c and 411 while the text input is input through the touch display 403. This provides for an intuitive user interface where a user maintains a clear view of the status and operation of the device as well as allowing both easy control and text input.

In one embodiment a touch input in the application area 408 could initiate the command to switch to text input thus returning to the situation shown in FIG. 4e.

In one embodiment all touch input is regarded as text input while the text input area 409 is active or opened.

In one embodiment all touch input within the text input area is regarded as text input while the text input area 409 is active or opened and touch input outside the text input area is interpreted as a switch command inactivating the text input area.

It should be understood that the pen or stylus strokes detected, although displayed as pen traces in FIG. 4e, will disappear after a while leaving space for further input. The pen traces makes it easier for a user to see what has been input and where further input should be positioned in relation to the previous input such as when inputting diacritics or multiple symbol characters or character strings.

In one embodiment no traces are displayed.

In one embodiment the text input area 409 can be pulled or dragged of the display 403 by pulling on a tag 414. This provides an intuitive way of hiding and displaying the text input area. FIG. 4g shows the text input area 409 being half-way hidden. In FIG. 4g the underlying text, keys and other symbols are displayed clearly as the text input area is being pulled down. The text input area 409 is frosted or otherwise shaded as in FIG. 4h.

In one embodiment the text input area 409 is movable. The text input area is moved by either first giving a command through either an icon displayed on the display 403 or by a special movement of a stylus, like dragging on of the text input area's 409 edges or holding down the stylus for a predetermined time or to double clicking on its edges or inside it and then moving the area 409. As the area 409 is ready to be moved this could be indicated to a user with flashing edges or a color shift or a moving symbol such as an arrowed cross.

In one embodiment it is possible to change the size and shape of the text input area 409. This can be done by either a special command through a physical key or an icon being displayed on the display 403 or by for example dragging at the edges of the touch area 409. Another possibility is to hold down the stylus for a predetermined time on one of the edges or to click on it and then re-size the text input area 409. As the text input area 409 is ready to be re-sized this can be indicated to a user for example by flashing edges or arrows on the edges.

As the touch input area 409 can now be made any size and in any position the user can find a space on the screen where he can input text that does not hide any information he wants to keep track of or refer back to while inputting text.

If the text input area 409 is large as in FIGS. 4*a*, *d-f* or as in FIG. 4*c*, there is no need to move it around, resize it or perform other activities and this enables the device to be used in a quick and easy way.

The enlarged input area provided by the overlapping text input area 409 of this application thus provide the user with a large area for text input while still maintaining control and overview of a device's status and operation.

In one embodiment the text input area 409 overlaps the status area and the application area as in FIG. 4*c* and any touch input received though the text input area 409 is interpreted as text input leaving a trace on the screen. Any touch input received through the control area 406 is interpreted as control input, but does not switch or de-active the text input area 409 unless specifically instructed to do so.

In one embodiment the text input area fills the full screen or display as in FIG. 4*d* and any touch input received anywhere on the display is interpreted as text input. The physical keys 404*b* and *c* are used to switch or de-activate the text input area or to provide other control commands. Alternatively a small tag 414 as in FIG. 4*g* is displayed on the text input area 409 and any pulling, dragging or tapping input in this tag 414 is interpreted as a resizing or de-activating command.

These two embodiments benefit from all the advantages described in this application and provides a user interface that is easy and intuitive to use and allows a user to input large characters or strings of characters while maintaining a clear overview of the device's status and operation.

Alternatively the text input area can also have guide lines or a guide grid to help the user input text correctly and with proper relation to the previously entered characters or symbols.

In one embodiment the user can input control commands through the text input area by first holding the stylus pressed against the touch display for a pre-determined time, in practice making a long-press with the stylus indicating to the controller 300 that the next input is a control input, and then with or without lifting the stylus input the control command directly afterwards. One example could be when a user is filling in several fields like name fields. If there are three fields the user could choose the first field by tapping in it. A text input area is activated and displayed and the user can input the name with the stylus. As the user has finished the name and wants to input the name for the second field he can simply make a long-press on that field. This will indicate to the controller that the name is ready and that the next field will be chosen for input. As the user then lifts the stylus and starts writing the input is directed to the second field. In one implementation this could be implemented as requiring two long-presses after each other; one to indicate that a command input is due and the other to choose the field.

Figure 5A:
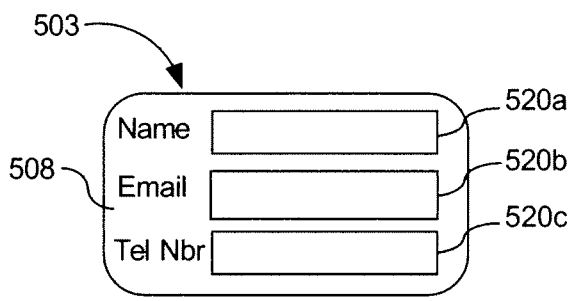
Figure 5B:
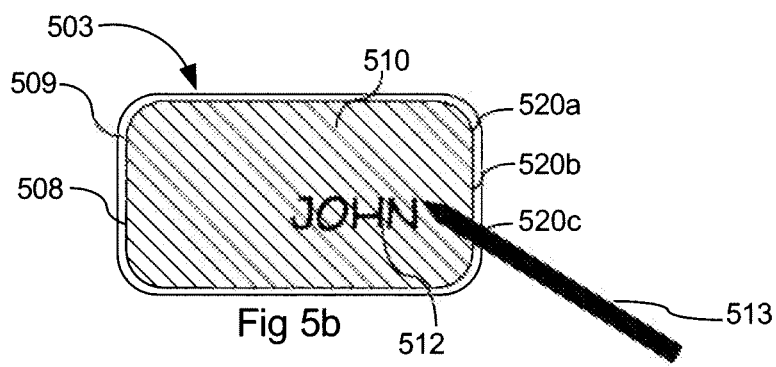
Figure 5C:
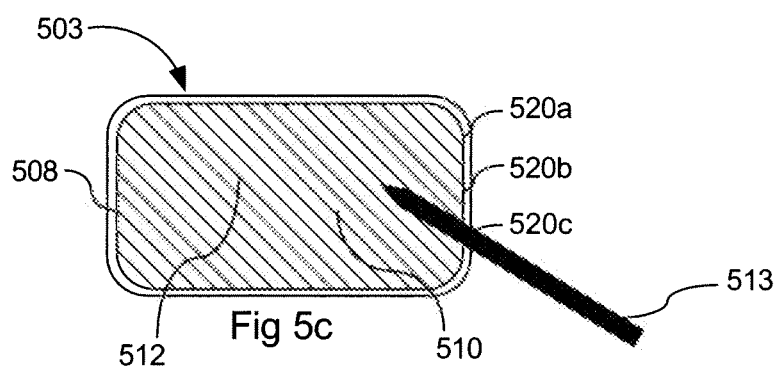
Figure 5D:
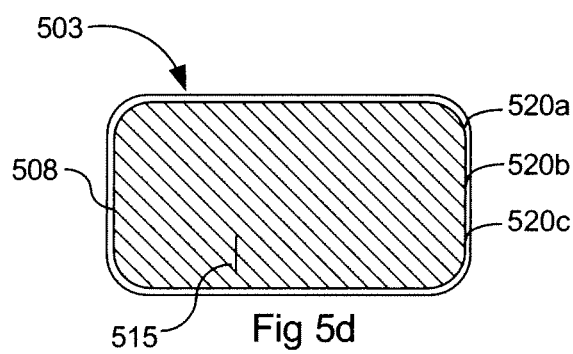

One embodiment will now be described with reference to FIG. 5*a* showing the display image of a touch display 503 in a device (not shown). In an application area 508 shown in the display there are three fields 520*a*, 520*b* and 520*c* to fill out. To enable a user to fill out the fields 520 a text input area 509 is shown overlapping the fields 520 in the application area 508, see FIG. 5*b*. The text input area 509 is has a frosted look so it shades the underlying content and the user can start writing text 512 using a stylus 513 that will be displayed on the text input area 509. The text 510 will also be displayed in the first field 520*a*, in this case the user inputs a name "John". In a next step the user makes a long-press with the stylus 513 in the second field 520*b* which is then selected for input. The user inputs an email address a few words at a time. The pen traces 512 shown in the text input area 509 are removed after a while leaving more room or space to input further characters or words without cluttering the display, see FIG. 5*c* where only the last part of the email address is shown "web.com". The whole email address ("John@web.com") 510 will be displayed in the second field 520*b*. Thereafter the user can repeat the long-press in the third field 520*c* to input a telephone number. As can be seen in FIG. 5*d* an indicator 515 is shown in the active field, in this case the third field 520*c* that indicates which field is ready for input.

It should be understood that selection of the different fields may also be done via physical keys (not shown) or through other commands as described above with reference to FIG. 4.

The use of a special touch input enables a controller to differentiate a control command embedded in a text input so although all touch input is interpreted as text input a special touch input, as a gesture, a long press, triple tapping or other clearly discernible touch, can be used to indicate that the coming input is a control command. After the control command has been input the user interface is ready for further text input.

It should be noted that the display as above could also be arranged with a control area having command keys for selecting the fields or perform other commands such as DELETE, SEND, SUBMIT, STORE or similar. If such an area was arranged a user interface and/or device could be arranged to interpret or process all touch input in the text input area 509 as hand writing and all touch input received through the control area as control commands. This could be achieved through a method implemented for example in computer software.

It should be understood that the manner in which a controller can be designed to recognize a special touch for temporarily accepting control command input can also be used in the other embodiments described herein.

Figures 6A, 6B:
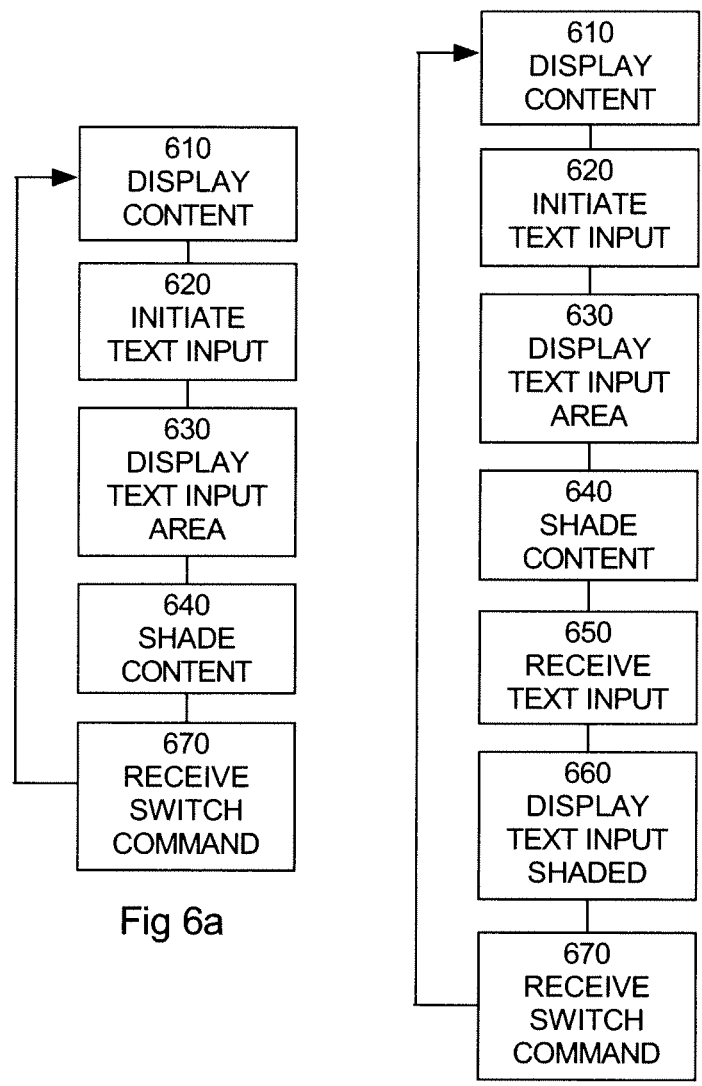

FIG. 6*a* show a method according to the teachings herein. In a first step 610 the status of the device, the controls available and any other application data, i.e. the content of the display, is displayed. As a user wants to input some text the device initiates text input in step 620 and a text input area is displayed in step 630 overlapping some or all of the content displayed. The overlapped or underlying content is shaded in step 640 so as to keep a clear and uncluttered view of the displayed content available for the user. The text input area is now ready for use until a switch command is given in step 670 and the method returns to step 610.

FIG. 6*b* show a method as in FIG. 6*a* where a user inputs text and the device receives text input in a step 660 which text input is displayed as part of the content in step 660 so the user can keep track of what has been input, the operation and status of the device without cluttering the view and leaving ample space for further input.

It should be understood that the steps taken as described with reference to FIGS. 4 and 5 also constitute method steps and as such can be combined with the methods as described with reference to FIG. 6 in any combination of individual steps.

The various aspects of what is described above can be used alone or in various combinations. The teaching of this application may be implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones, but can be equally well applied in Personal digital Assistants (PDAs), game consoles, MP3 players, personal organizers or any other device designed for providing information while maintaining low power consumption.

The various embodiments disclosed herein referring to features such as the shading, the size of the text input area, how input is interpreted etc. can all be combined depending on designer and user needs.

The teaching of the present application has numerous advantages. Different embodiments or implementations may yield one or more of the following advantages. It should be noted that this is not an exhaustive list and there may be other advantages which are not described herein. One advantage of the teaching of this application is that a user interface for a device can be used for accurate text input while still maintaining an overview of a device having only a limited display size. Thus, the teachings herein find particular use with small devices or devices having small displays or user interfaces for such devices.

Another advantage is that real and/or virtual control buttons may be used to move the cursor while at the same time using text recognition for writing, without any confusion to the user about switching modes. Also operations like delete, cut, copy, paste may be performed by control buttons.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone, it should be appreciated that the teachings of the present application may also be applied to other types of electronic devices, such as music players, palmtop computers and the like. It should also be noted that there are many alternative ways of implementing the methods and apparatuses of the teachings of the present application.

The term "comprising" as used in the claims does not exclude other elements or steps. The term "a" or "an" as used in the claims does not exclude a plurality. A unit or other means may fulfill the functions of several units or means recited in the claims.

The invention claimed is:

1. A method comprising:
   causing display of application content in at least one first area of a touch display,
   receiving a text input from the touch display,
   activating a text input mode and causing provision of an at least partially transparent text input area,
   causing the display of the text input in the text input area, the text input area at least partially overlapping said at least one first area,
   causing at least a first portion of the text input to disappear from display so as to allow additional space for at least a second portion of text input,
   causing at least the first and second portions of the text input to be progressively provided in the first area in response to deactivating the text input mode, and
   interpreting input via said touch display as text input when said text input area is actively displayed and otherwise interpreting the input via said touch display as control input.

2. A method according to claim 1, wherein said text input area has a size substantially equal to said touch display.

3. A method according to claim 1, further comprising interpreting input through said text input area as text input when said text input area is actively displayed and interpreting input outside said text input area as control input.

4. A method according to claim 3, further comprising causing the display of said received text input clearly in said text input area with a changed appearance in said first area when said text input area is displayed actively.

5. A method according to claim 4 further comprising detecting a special touch input and thereafter receiving control input from said text input.

6. A method according to claim 5 wherein said special touch input is a long-press.

7. A method according to claim 1, wherein said at least one first area comprises a control area and wherein said content is at least one virtual key associated with application control.

8. A method according to claim 1, wherein said at least one first area comprises a status area and wherein said content comprises a status indicator.

9. A non-transitory computer program product comprising at least one non-transitory computer readable medium having computer-executable program code instructions stored therein, the computer-executable program code instructions comprising program code instructions to:
   cause display of application content in at least one first area of a touch display;
   receive a text input from the touch display;
   activate a text input mode and cause provision of an at least partially transparent text input area;
   cause the display of the text input in the text input area, the text input area at least partially overlapping said at least one first area;
   cause at least a first portion of the text input to disappear from display so as to allow additional space for at least a second portion of text input;
   cause at least the first and second portions of the text input to be progressively provided in the first area in response to deactivating the text input mode, and
   interpret input via said touch display as text input when said text input area is actively displayed and otherwise interpret the input via said touch display as control input.

10. An apparatus comprising:
    at least one processor; and
    at least one memory including computer program code,
    the at least one memory and the computer program code configured to, with the at least one processor:
    cause display of application content in at least one first area of a touch display,
    receive a text input from the touch display,
    activate a text input mode and cause provision of an at least partially transparent text input area,
    cause the display of the text input in the text input area, the text input area at least partially overlapping said at least one first area,
    cause at least a first portion of the text input to disappear from display so as to allow additional space for at least a second portion of text input,
    cause at least the first and second portions of the text input to be progressively provided in the first area in response to deactivating the text input mode, and
    interpret input via said touch display as text input when said text input area is actively displayed and otherwise interpret the input via said touch display as control input.

11. The apparatus of claim 10, wherein said text input area has a size substantially equal to said touch display.

12. The apparatus of claim 10, wherein the at least one memory and the computer program code are further configured to, with the at least one processor, interpret all input through said text input area as text input when said text input area is actively displayed and interpret all input outside said text input area as control input.

13. The apparatus of claim 12, wherein the at least one memory and the computer program code are further configured to, with the at least one processor, cause the display of said received text input clearly in said text input area with a changed appearance in said first area when said text input area is displayed actively.

14. The apparatus of claim 13, wherein the at least one memory and the computer program code are further configured to, with the at least one processor, detect a special touch input and thereafter receive control input from said text input.

15. The apparatus of claim 14 wherein said special touch input is a long-press.

16. The apparatus of claim 10, wherein said at least one first area comprises a control area and wherein said content is at least one virtual key associated with application control.

17. The apparatus of claim 10, wherein said at least one first area comprises a status area and wherein said content comprises a status indicator.

* * * * *